June 19, 1956

R. J. HOPPER ET AL 2,751,167

REELING APPARATUS FOR CONTROLLING A TOW CABLE FROM AN AIRCRAFT

Filed Sept. 2, 1954

ROBERT J. HOPPER &
NEIL LAMONT,
INVENTORS.

BY George J. Smyth

ATTORNEY.

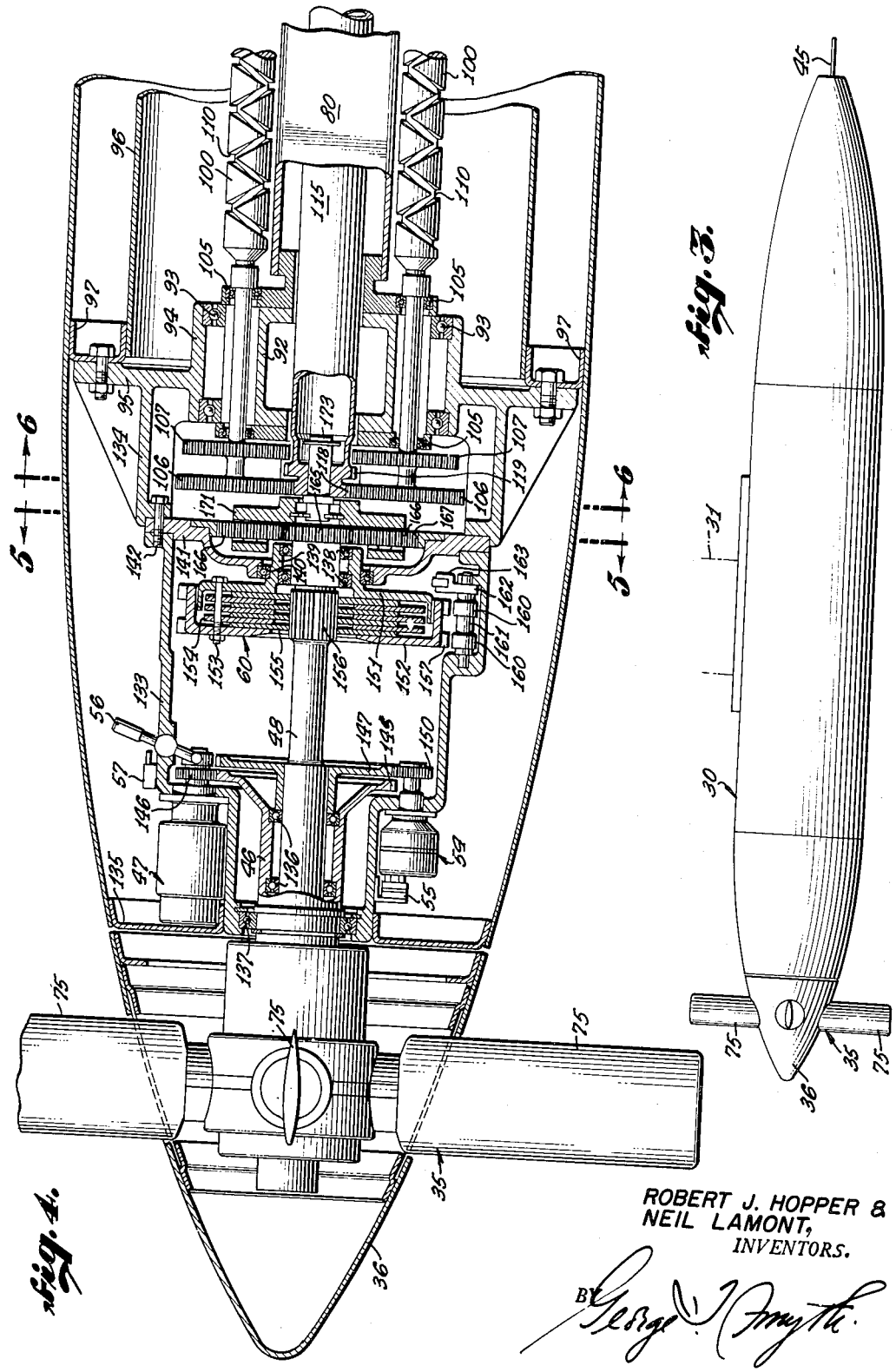

June 19, 1956

R. J. HOPPER ET AL 2,751,167

REELING APPARATUS FOR CONTROLLING A TOW
CABLE FROM AN AIRCRAFT

Filed Sept. 2, 1954

ROBERT J. HOPPER &
NEIL LAMONT,
INVENTORS.

BY George D. Smyth

ATTORNEY.

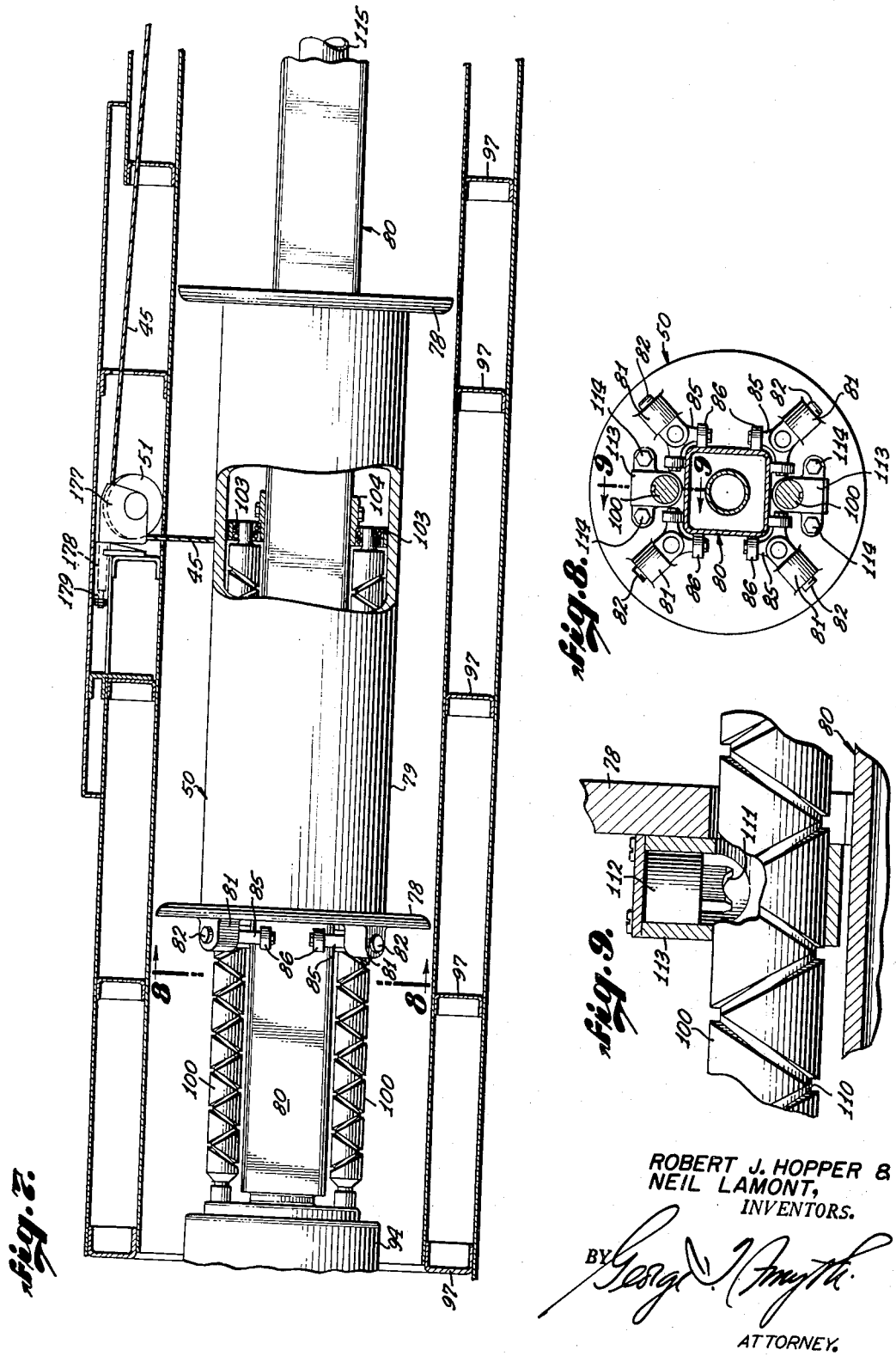

June 19, 1956
R. J. HOPPER ET AL
2,751,167
REELING APPARATUS FOR CONTROLLING A TOW CABLE FROM AN AIRCRAFT
Filed Sept. 2, 1954
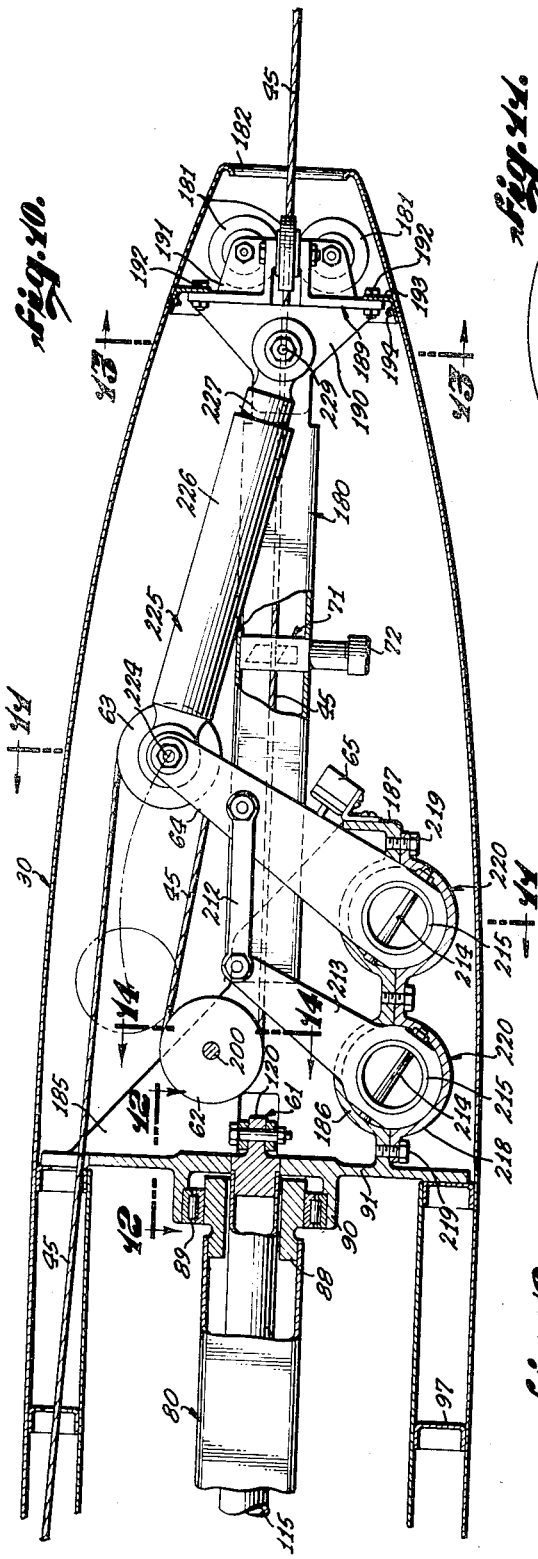
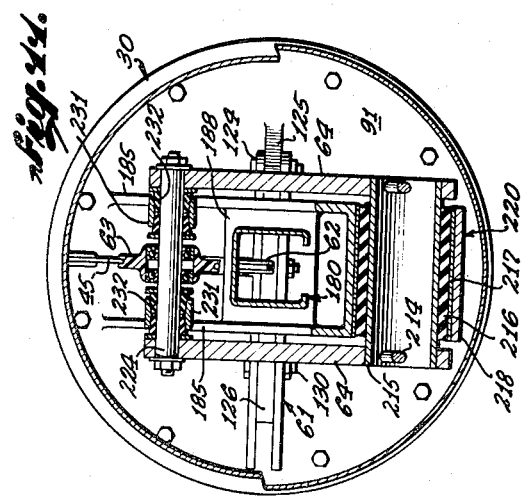
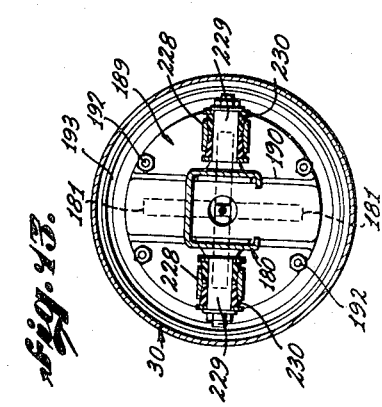
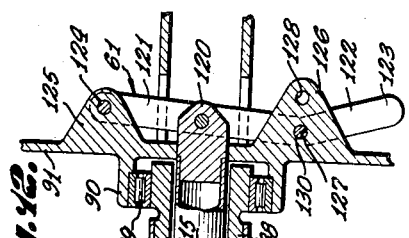
ROBERT J. HOPPER &
NEIL LAMONT,
INVENTORS.
BY *George J. Smyth*
ATTORNEY.

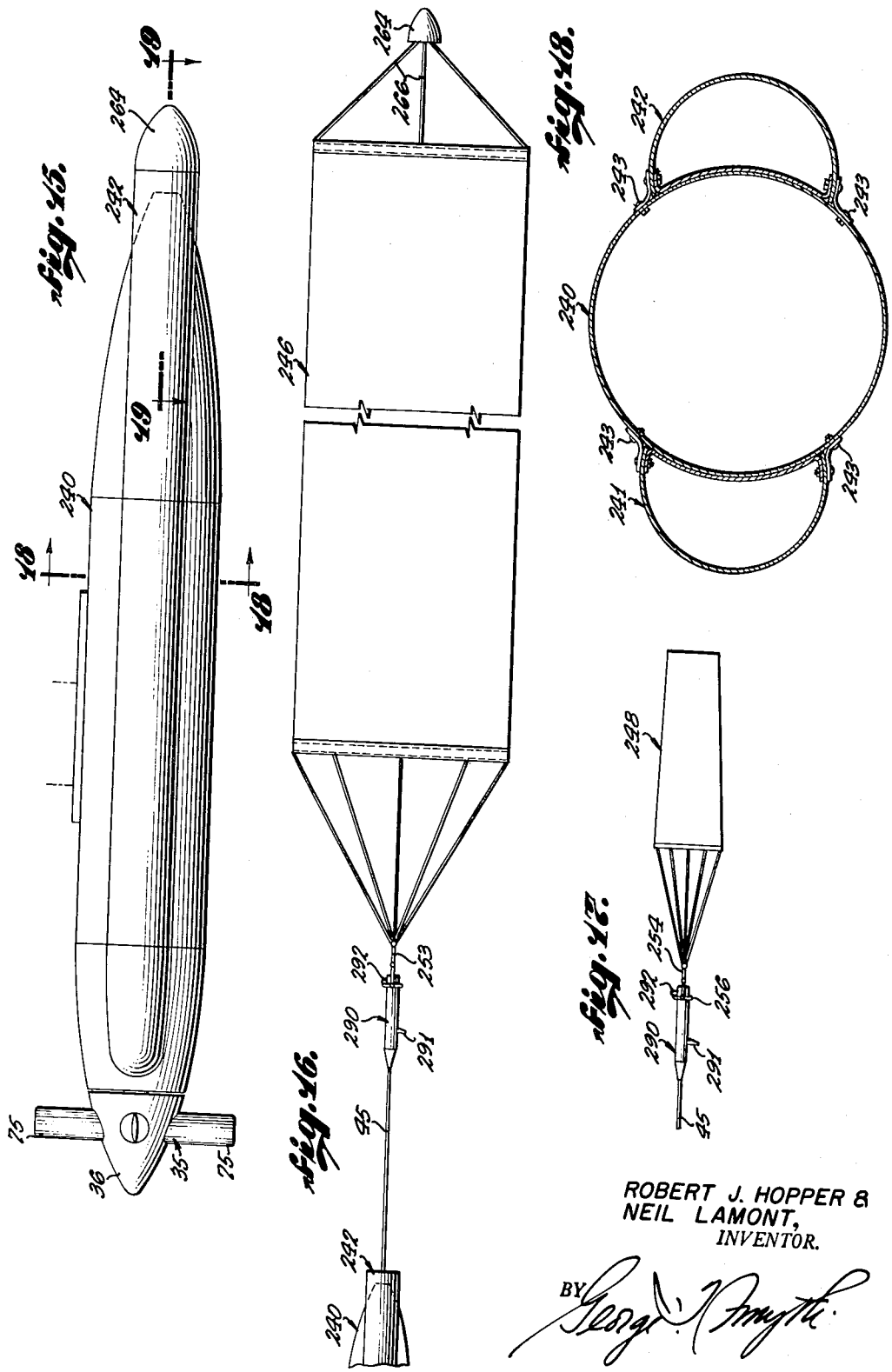

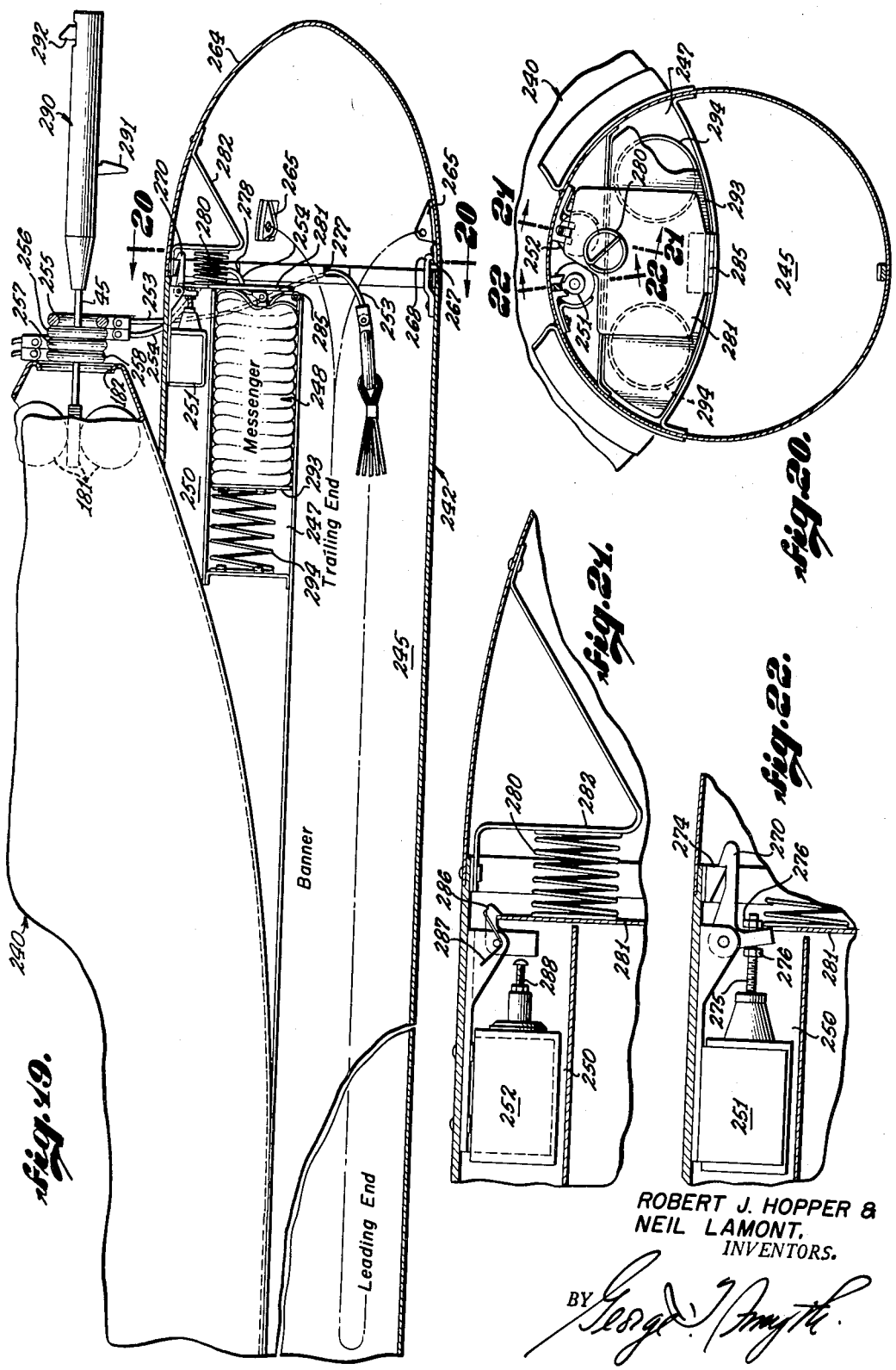

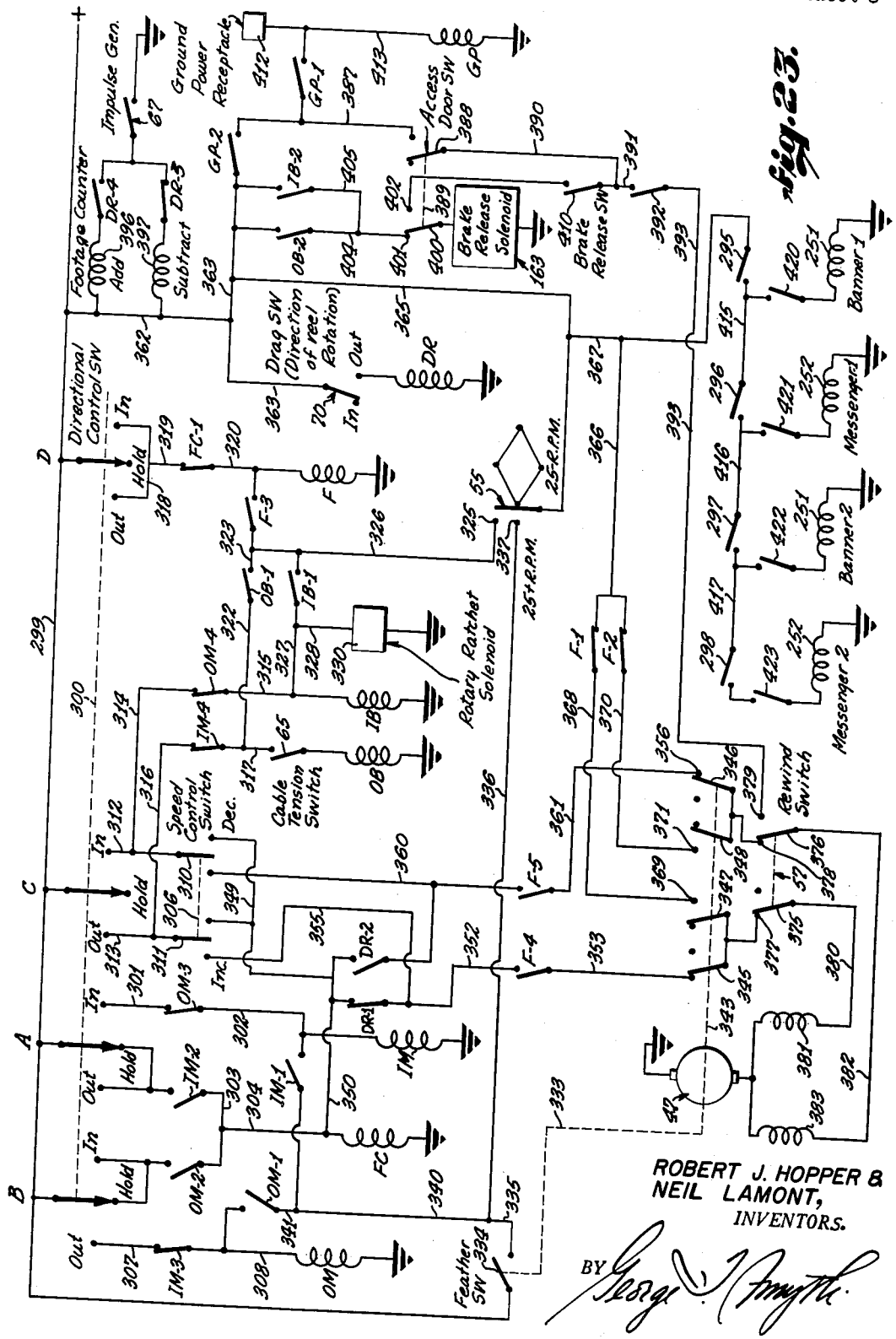

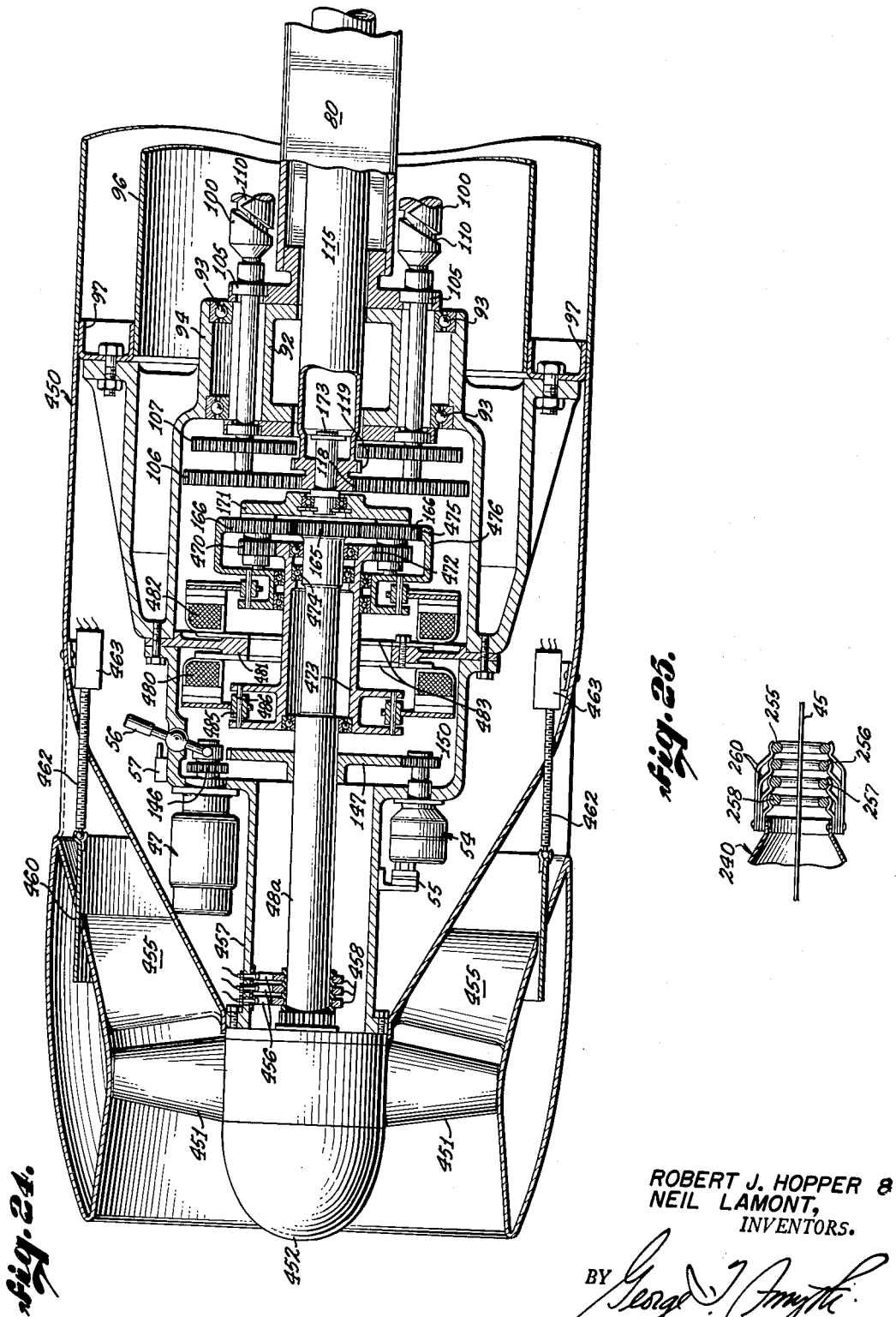

2,751,167

REELING APPARATUS FOR CONTROLLING A TOW CABLE FROM AN AIRCRAFT

Robert J. Hopper, Pacific Palisades, Calif., and Neil Lamont, Shalimar, Fla., assignors to Del Mar Engineering Laboratories, Inc., Los Angeles, Calif., a corporation Application September 2, 1954, Serial No. 453,834

27 Claims. (Cl. 244—1)

This invention relates to apparatus for use on an aircraft to reel in and out a cable for towing various devices including instruments, detectors, targets, and the like. While the invention in its various aspects has many different potential uses, it is being initially embodied in a device for towing a target from an aircraft. This particular practice of the invention has been selected for the present disclosure to illustrate the principles involved and will provide adequate guidance for those skilled in the art who may have occasion to apply the invention to other specific purposes.

The target towed by the cable may be of various constructions and designs but typically comprises a banner six to nine feet in width and 30 to 45 feet in length that is weighted for vertical orientation. For target practice the banner is towed on the end of a cable that may extend several thousand feet behind the aircraft. The preferred procedure made possible by the invention is to reel the cable and banner in close to the towing aircraft, release the banner and then launch another banner. For this purpose the banner is connected to the cable by a special latch mechanism and is released by what is known as a messenger that moves along the cable in response to air resistance and slides a ring along the cable to release the latch mechanism at the banner end of the cable.

Since the adaptation of an aircraft to the task of towing target banners by means of a cable that is reeled in and out involves substantial modification of the aircraft and the addition of considerable structure, usually an aircraft is set aside for target flights exclusively, even though the aircraft may be idle for considerable periods of time. It is possible, of course, to use the idle specialized aircraft for other purposes but its usefulness is curtailed, especially when the added structure extends into the air stream in such manner as to reduce the aerodynamic efficiency of the aircraft.

A further disadvantage is that since the cable handling equipment is permanently installed on the aircraft, any need for servicing, repairing, or overhauling the cable-handling equipment puts the aircraft out of service. It is also to be noted that whenever it becomes desirable to use another type of aircraft having a higher speed or differing in flight characteristics in some other respect, then a second aircraft must be specialized in the same more or less permanent manner to reduce the range of usefulness of the second aircraft in the same way.

The present invention is directed to the concept of providing a self-contained towing unit that may be quickly and easily mounted on any aircraft in a quickly removable manner. For this purpose the preferred embodiment of the invention includes a pod or streamlined housing that may be releasably mounted on the aircraft in the same manner as a jettisonable fuel tank, and further includes a control panel that may be removably mounted in the cockpit of the aircraft for remote control of the mechanism in the towing pod. The towing pod may be self-contained even to the extent of storing one or more sets of target banners and messengers to permit launching targets onto the tow cable while in flight in addition to housing the cable-controlling mechanism. Thus this present invention provides the scheme of multiple target launchings from a single tow reel.

A special feature of the preferred practice of the invention is the provision of a built-in power plant in the towing pod that is entirely independent of the power plant of the aircraft and is subject to accurate remote control from the cockpit of the aircraft. In this regard the invention is characterized by the concept of using means such as a turbine or air screw to derive power from the airstream. Such an arrangement eliminates the problem of transmitting power from the power plant of the aircraft to the pod for actuating the reel. The only power that must be transmitted is the relatively little power required for remote control of the towing unit. While control of the actuation of the reel by the airstream may be achieved in various ways, the preferred practice of the invention is further characterized by the concept of using a variable pitch air screw or propeller that may be adjusted for full feathering and for pitch changes in both directions from full feathering.

Another major and novel feature of subject invention is the arrangement of the reel on an axis of rotation parallel to the air stream thereby permitting the unit to be packaged in a long streamlined pod for attachment to the aircraft on bomb shackles or underwing pylons in a low drag configuration of round cross section. Such a shape is not only aerodynamically efficient but is also easier to construct than any similar pod built around the conventional winch-type of reel installations currently in use for aircraft.

Another major feature of novelty in subject invention is the shuttling drum for this reel which eliminates the major wear generally associated wtih aircraft cable reel level-wind mechanisms. In this reel, the drum itself is shuttled back and forth to handle the cable level-wind feature in successive layers, thereby to disassociate the pull load of the cable from the longitudinal loading of the level-wind mechanism and thus eliminating the major cause of wear and mechanical breakdown in aircraft cable reel systems. The novel shuttling system for the cable drum is arranged inside the drum which not only seals off this mechanism from dirt brought in by the rewinding of cable but also permits a new and novel concentric shuttle drive which is both simple and rugged. Conventional level-wind mechanisms shuttle a pulley across the reel drum from a parallel external shaft.

Another major feature of great novelty in subject invention is the arrangement of a true shock absorption mechanism between the reel drum and the extended cable which has a very high degree of energy absorption capacity with considerable action and stroke to prevent cable breakage upon sudden jerking of the tow line, upon surging of targets under tow and upon launching of banners and heavy targets onto the tow line while in flight. This feature is believed to be of great value to the utility of the reel in this invention permitting this reel to perform heavy duty towing and launching of high-drag light-weight banner targets and low-drag heavy rigid winged targets which could not otherwise be flight launched on the necessary smaller diameter cables which permit large reel-length capacity.

The invention is further characterized by a system for remote indication of the state of the tow cable, this remote control system having certain automatic features. The pilot can ascertain at a glance the rate at which the cable is being reeled in or out and can also ascertain at a glance the distant number of feet of cable unwound from the reel. By means of simple controls he can cause the reel to be immobilized or he can cause the reel to accelerate or decelerate in either direction of the pitch adjustment of the propeller being automatically varied for whatever control effects are required.

The preferred control system incorporates a number of automatic safeguards to make remote control of the tow unit fool-proof. These safeguards include: provision for normally automatically immobilizing the reel by brake means in the absence of control signals for rotating the reel in either of its opposite directions; provision for feathering the propeller automatically in the absence of such control signals; provision for routing the control signals to cause the required pitch changes of the propeller; provision for delaying the braking action automatically in the deceleration of the reel until the propeller acting in opposition to the reel has opportunity to reduce the speed of rotation of the reel to a predetermined magnitude; provision for automatically delaying pitch-changing response to control signals for one direction of rotation of the reel until rotation of the reel in the opposite direction has been decelerated to a desired degree; provision for automatic braking of the reel in the course of a reeling-out operation whenever the tension of the cable drops below a predetermined magnitude; provision for automatic ratchet action to prevent out-rotation of the reel throughout the duration of an in-rotation control signal.

The preferred control system for handling a plurality of sets of banners and messengers is further characterized by a fool-proof arrangement that insures release of the banners and messengers in the proper order. Two sets of banners and messengers, for example, require four rings which are arranged in a predetermined sequence surrounding the cable and are releasably held in position until release is required. The control system provides four corresponding normally open switches to release the banners and messengers in the correct sequence and the switches are placed in series in such manner that the switches are effective only when actuated in the correct sequence.

Further features of the preferred practice of the invention relate to the mechanism per se of the control unit. These features include: the provision of a motor unit that normally actuates the pitch-changing mechanism of the propeller, but may be used alternately, if desired, to power the reel for winding in the cable when the aircraft is on the ground; a drive mechanism for the reel that includes means for causing relative reciporation between the reel and the cable feed, thereby automatically leveling the winding of the cable on the reel; the provision of means for varying the rate of such reciprocation with respect to the rate of rotation of the reel in accord with different cable diameters; the inclusion of shock-absorber means responsive to changes in tension of the cable; and the inclusion of remotely controlled electrically actuated means independent of the electrical system of the aircraft to cut the cable in an emergency.

The various features and advantages of the invention may be understood from the following detailed description considered with the accompanying drawings.

In the drawings, which are to be regarded as merely illustrative:

Figure 3 is a side elevation of the pod or streamlined housing shown in Figure 1;

Figure 4 is a longitudinal view largely in section of the forward portion of the pod or reeling unit;

Figure 7 is a longitudinal view largely in section showing the intermediate portion of the pod or reeling unit;

Figure 8 is a transverse section taken as indicated by the line 8—8 of Figure 7;

Figure 9 is an enlarged fragmentary section taken as indicated by the line 9—9 of Figure 8;

Figure 10 is a longitudinal view partly in section showing the trailing end of the pod or reeling unit;

Figure 11 is a transverse section taken as indicated by the broken line 11—11 of Figure 10;

Figure 12 is a fragmentary section taken as indicated by the line 12—12 of Figure 10;

Figure 13 is a section taken as indicated by the transverse line 13—13 of Figure 10;

Figure 15 is a side elevation of a pod or reeling unit that is adapted to carry a plurality of sets of banners and messengers;

Figure 16 is a side elevation of a target banner being towed by a cable extending rearward from the reeling unit;

Figure 17 is a side elevation of a messenger on the end of the towing cable;

Figure 18 is a transverse section on an enlarged scale taken as indicated by the line 18—18 of Figure 15;

Figure 19 is a greatly enlarged fragmentary section taken as indicated by the line 19—19 of Figure 15;

Figure 20 is a transverse section taken as indicated by the line 20—20 of Figure 19;

Figure 21 is a fragmentary section taken as indicated by the line 21—21 of Figure 20;

Figure 22 is a fragmentary section taken as indicated by the line 22—22 of Figure 20;

Figure 23 is a wiring diagram of the preferred control system for the reeling unit;

Figure 24 is a view similar to Figure 4 illustrating another embodiment of the invention, and Figure 25 is a sectional view showing how four rings are releasably retained by spring fingers.

*General arrangement*

Figure 1:
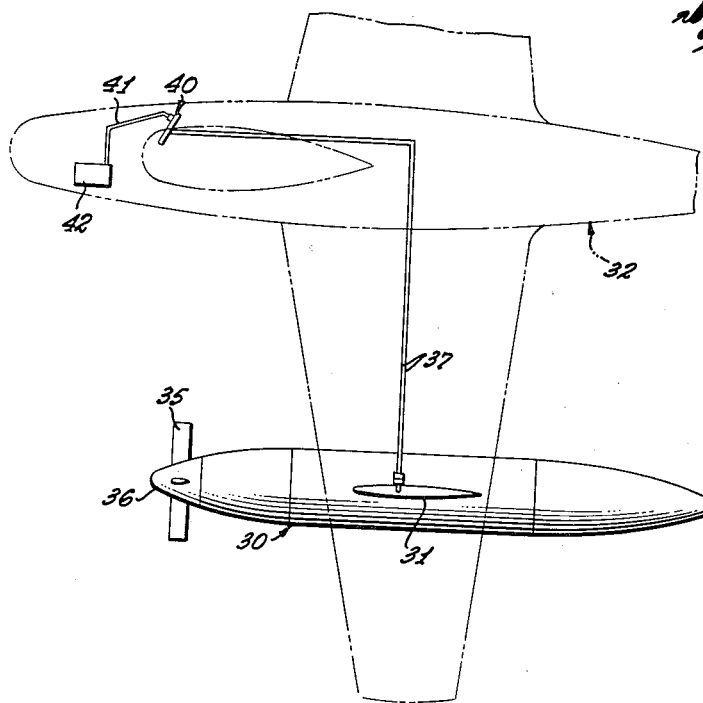
Figure 1 is a schematic plan view of an aircraft showing how the invention may be embodied in a towing unit in the form of a pod releasably mounted on the wing of the aircraft, the pod being connected for remote control with a control panel that is removably mounted in the cockpit of the aircraft.

Figures 1 and 3 show what may be termed a towing unit or reeling unit, generally designated by numeral 30, in the form of a pod or streamlined housing that is connected by releasable shackles (not shown) to a pylon 31 on the underside of an aircraft 32 in the same general manner as a bomb or a jettisonable fuel tank. The mechanism of the unit is actuated by a variable pitch air screw or propeller 35 having a hub shroud 36 that forms a nose on the landing end of the unit. Electric conductors for remote control of the unit 30 are provided by an electric cable 37 that extends from the unit 30 through the pylon 31 to a control panel 40 which is preferably located in the cockpit of the aircraft. The control panel 40 is connected by a second electric cable 41 with a power supply 42 which may be the electrical system of the airplane or may be a special power source for controlling the unit 30. The unit 30 controls a tow cable 45 which extends rearward from the unit when in towing service as shown in Figure 3.

The basic components of the unit 30, as shown in Figures 4, 7 and 10, include a pitch control mechanism operated by a rotary sleeve 46; a pitch-control motor 47 for actuating the pitch control sleeve 46; a drive shaft 48 for actuating a cable reel that is generally designated by numeral 50; and a guide sheave 51 for guiding the cable 45 relative to the reel in the winding and unwinding of the cable. It is contemplated that the cable will be leveled in its winding onto the reel 50 by providing appropriate relative reciprocative movement between the reel 50 and the guide sheave 51, the reciprocating movement being longitudinally of the reel. For this purpose the reel 50 is caused to reciprocate longitudinally along its axis, as will be described.

The preferred practice of the invention includes the following additional components: a rotary ratchet means 54 that is operatively connected to the drive shaft 48; a centrifugal switch 55 which is also operatively connected to the drive shaft 48; gear shift means including a manually operable lever 56 for operatively connecting the pitch control motor 47 with the drive shaft 48 when desired; a normally open re-wind switch 57 that is operated by the gear shift lever 56; a brake, generally designated 60, for immobilizing the cable reel 50; means including a manually operable lever 61 (Figures 10, 11 and 12) to vary the rate of reciprocation of the reel 50 relative to the rate of rotation of the reel in accord with the different diameters of tow cables that may be used with the reel; shock absorber means including an idler sheave 62 and a sheave 63 mounted on a pair of shock absorber arms 64; a tension-responsive micro-switch 65 positioned for operation by the shock absorber arms 64; a tachometer, including a tachometer generator 66 (Figure 14) for ascertaining the speed at which the tow cable 45 is reeled in or out; a footage meter including an impulse generator 67 (Figure 14); a drag switch 70 (Figure 14a), to sense the direction of rotation of the cable reel 50; and an emergency cable cutter 71 (Figure 10) actuated by the detonation of an explosive in a device 72 under remote control from the cockpit of the aircraft and energized by a current source separate from the electrical system of the aircraft.

*General mode of operation*

Normally the cable reel 50 is immobilized by the brake 60 with the blades 75 of the propeller 35 feathered. To reel out the tow cable 45, the motor 47 is energized by remote control to change the pitch of the propeller blades 75 in a direction to cause the propeller to rotate the cable reel in the out direction and the brake 60 is released to free the cable reel for the desired rotation. For increase in the rate of reeling out the tow cable, the pitch of the propeller blades 75 is increased in the same direction and for decrease in the rate of reeling out, the pitch of the propeller blades is decreased.

For decelerating the cable reel 50 in its unwinding operation the motor 47 is energized for reverse rotation to reverse the pitch of the propeller blades 75 to cause the energy derived from the air stream to oppose the unwinding rotation of the reel. If it is desired to bring the reel to a full stop in its unwinding rotation, the opposition of the propeller to such rotation is continued until the reel is decelerated to a predetermined degree, the brake 60 is again applied to immobilize the reel, and the propeller is feathered. Rotation of the cable reel 50 for winding or reeling in the tow cable 45 is accomplished in the same manner by pitch adjustment of the propeller 35 and release of the brake 60. The speed or rate of travel of the tow cable 45 in the reeling or the unreeling of the cable is sensed by the tachometer generator 66 and the footage of the unreeled portion of the tow cable is sensed by means of the impulse generator 67.

The function of the rotary ratchet means 54 is to keep the tension of the cable from rotating the reel 50 in an unwinding direction in the occasional brief time intervals during which a control signal is calling for winding rotation of the reel 50 and the pitch of the propeller 35 is in process of changing to cause such rotation, but is short of a degree of pitch change to cause the desired rotation. The function of the tension-responsive switch 65 is to cause the brake 60 to be applied in the course of the unwinding rotation of the reel 50 whenever the tow cable 45 slackens. Thus the switch 65 cooperating with the brake 60 prevents the reel 50 from overrunning the tow cable 45 thereby preventing snarling of the cable inside the housing of the unit.

The function of the drag switch 70 is to sense the direction of rotation of the reel 50 to prevent anomalous action in the control system as will be made apparent. To cause winding rotation of the reel 50 when the aircraft is on the ground, the gear shift lever 56 is manually operated to connect the pitch control motor 47 with the drive shaft 58 and the function of the rewind switch 57 is to respond to this operation of the lever 56 by placing the correct field coil in the motor circuit to make sure the motor rotates in the direction to reel in the cable. The function of the centrifugal switch 55 is, in part, to cause the brake 60 to be applied for immobilization of the reel 50 when the reel has been decelerated to a predetermined degree by the resistance of the variable pitch propeller 35.

*Means for mounting and reciprocating the reel*

The reel 50 which has two end walls 78 interconnected by a cylindrical wall 79 is slidingly, but non-rotatably mounted on a hollow shaft 80 of rectangular cross-sectional configuration. For the reduction of friction in the longitudinal movement of the reel on the hollow shaft 80, the forward end wall 78 of the reel is formed with four ears 81 in which clevis members 82 are rotatably mounted. Pivotally mounted on each of the clevis members 82 is an angular member 85 that straddles one corner of the hollow rectangular shaft 80 and carries two rollers 86 in engagement with the shaft.

The rear end of the hollow rectangular shaft 80 is united with a body 88 (Figure 10) that is rotatably supported by a bearing 89. The bearing 89 is supported, in turn, by a cylindrical flange 90 that is integral with a transverse wall 91. The forward end of the hollow rectangular shaft 80 is united with a second body 92 (Figure 4) that is journalled in a second bearing 93. The second bearing 93 is mounted in a cylinder 94 formed by a second forward transverse wall 95. A thin sheet metal cylinder 96 interconnects the two transverse walls 91 and 95 to form therewith a cylindrical chamber in which the reel 50 reciprocates. At spaced points the sheet metal cylinder 96 is reinforced and supported by circumferential spacer rings 97 of channel-shaped cross-sectional configuration.

The reel 50 is reciprocated on the hollow rectangular shaft 80 by means of a pair of auxiliary shafts 100 that are carried by shaft 80. The rear ends of the auxiliary shafts 100 are journalled in bearings 103 (Figure 7), which bearings are carried by a collar 104 that fixedly embraces the hollow rectangular shaft 80. As shown in Figure 4, the forward ends of the two auxiliary shafts 100 are journalled in bearings 105 carried by the forward shaft body 92 and each of these forward ends of the two auxiliary shafts carries a pair of axially spaced gears 106 and 107, the gear 107 being smaller in diameter than the gear 106. Each of the two auxiliary shafts 100 is provided with a continuous peripheral groove 110 having the form of two opposite helices. Each of the grooves 110 cooperates in a well known manner with a corresponding blade 111 (Figure 9) to cause reciprocation of the reel 50. Each blade 111 is integral with a cylindrical body 112 that is freely rotatable on its axis inside a small casing 113. The casing 113 is mounted on the forward end wall 78 of the reel by suitable screws 114 (Figure 8) and surrounds a corresponding auxiliary shaft 100 to hold the blade 111 in the groove 110 of the shaft. The rotational freedom of the cylindrical body 112 permits the blade 111 to oscillate to follow the changes in direction of the corresponding groove 110 to cause the desired reciprocation of the reel.

Slidingly mounted inside the hollow rectangular shaft 80 is a non-rotary shaft 115 which is movable longitudinally between two positions. Integral with the forward end of the shaft 115 is a relatively small non-rotary pinion 118 to mesh with the two relatively large gears 106 at one longitudinal position of the shaft and also integral with the forward end of the shaft is a second non-rotary pinion 119 to mesh with the two relatively small gears 107 at an alternate longitudinal position of the shaft. Figure 3 shows the non-rotary shaft 115 in its forward position with the smaller pinion 118 in mesh with the two larger gears 106.

As shown in Figures 10 and 12, the rear end of the non-rotary shaft 115 is formed with a longitudinal ear 120 which extends into a longitudinal slot 121 of a gear shift lever 122 having a handle 123. The lever 122 is pivotally connected by a fulcrum pin 124 to an ear 125 on the rear side of the transverse wall 91, the ear 125 extending into the longitudinal slot of the lever. Also extending into the longitudinal slot of the lever is a second ear 126 having a pair of spaced apertures 127 and 128. A cross bolt 130 carried by the lever 122 may be inserted into the apertures 127 and 128 selectively.

When the cross bolt 130 is in the forward aperture 127 to hold the smaller pinion 118 in engagement with the two larger gears 106, the pinion 118 serves as a stationary sun gear and the two gears 106 serve as planet gears which are moved in an orbit to cause rotation of the two auxiliary shafts 100, thereby to reciprocate the reel 50. When the handle 123 is shifted to its second position with the cross pin 130 in the second rearward aperture 128, the second larger pinion 119 is in mesh with the two smaller gears 107 to cause the rate of reciprocation of the reel to be increased relative to the rate of rotation of the reel, as required for winding a cable of larger diameter on the reel.

*Means for rotating and braking the reel*

The drive shaft 48 for actuating the reel 50 is surrounded by an inner casing 133 which is supported at one end by a cylindrical extension 134 of the previously mentioned transverse wall 95 and is supported at the other end by a light sheet metal transverse wall 135. The forward end of the drive shaft 48 is journalled by bearings 136 in the previously mentioned rotary sleeve 46 of the pitch control mechanism and the rotary sleeve is, in turn, journalled in a bearing 137 that is mounted in the inner casing 133. The rear end of the drive shaft 48 is journalled by bearings 138 in a rotary hub 139 of the previously mentioned brake 60 and the rotary hub is, in turn, journalled in a bearing 140. The bearing 140 is mounted in a fixed casing wall 141 which is connected by screws 142 both to the inner casing 133 and to the cylindrical extension 134 of the transverse wall 95.

The inner end of the pitch controlling rotary sleeve 46 forms a gear 145 which is normally meshed with a pinion 146 driven by the motor 47. The previously mentioned gear shift lever 56 may be actuated to shift the pinion 146 axially into mesh with a second gear 147 that is keyed to the drive shaft 48. Thus the motor 47 may be operatively connected to the drive shaft when desired for actuating the reel 50. A pinion 150 is also in mesh with the gear 147 for operatively connecting the drive shaft 48 with the previously mentioned rotary ratchet means 54 and with the previously mentioned centrifugal switch 55.

The brake 60 has a housing made in two sections 151 and 152 interconnected by bolts 153, the brake housing section 151 being integral with the previously mentioned rotary hub 139. A series of circular friction plates 154 inside the brake housing are connected with the brake housing by the bolts 153 to rotate therewith. These friction plates 154 alternate with cooperating friction plates 155 that are engaged by splines 156 on the drive shaft 48. The brake housing is formed with peripheral stop teeth 157 which are adapted for engagement by other stop teeth 160 that are mounted radially on a rocker shaft 161. The rocker shaft 161 has a rocker arm 162 that is operatively connected to a brake release solenoid 163.

The bolts 153 are tightened sufficiently to press the friction plates 154 and 155 together to cause the two brake housing sections 151 and 152 to tend to rotate with the drive shaft 48, and normally the brake solenoid 163 is energized to hold the stop teeth 160 out of engagement with the stop teeth 157. Whenever the brake solenoid 163 is de-energized, however, a concealed spring (not shown) in the solenoid actuates the rocker shaft 161 to bring the lock teeth 160 in engagement with the peripheral stop teeth 157 to hold the two brake housing sections 151 and 152 against rotation. When the two brake housing sections are immobilized in this manner, the friction among the plates 154 that are operatively connected with the brake housing sections and the plates 155 that are operatively connected with the drive shaft 48 will provide sufficient resistance to rotation of the drive shaft to bring the drive shaft to a stop and to maintain the drive shaft immobilized in opposition to any rotational force that may be exerted by the propeller 35.

Figure 5:
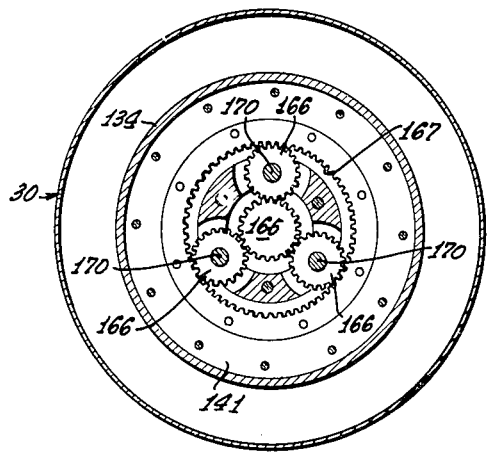
Figure 5 is a transverse section taken as indicated by the line 5—5 of Figure 4.
Figure 6:
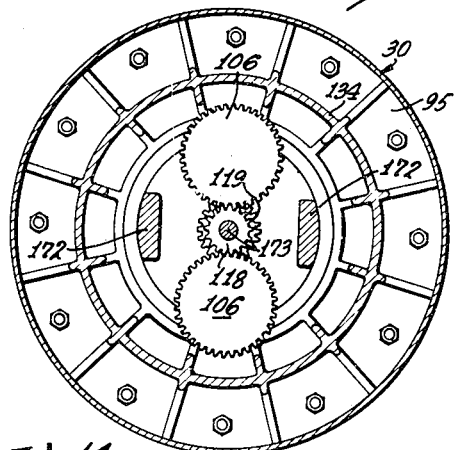
Figure 6 is a transverse section taken as indicated by the line 6—6 of Figure 4.

The drive shaft 48 is connected to the hollow rectangular shaft 80 by reduction gearing that includes a sun gear 165 on the rear end of the drive shaft and a plurality of planetary gears 166 (Figure 5). The planetary gears 166 are in mesh with a fixed ring gear 167 and are rotatably mounted by stub shafts 170 on a rotary cage 171 (Figures 4 and 5). The rotary cage 171 is formed with two parallel longitudinal members 172 (Figure 6) that extend rearward past the previously mentioned gears 106 and 107 and are rigidly connected to the body 92 at the forward end of the hollow rectangular shaft 80. Thus rotation of the sun gear 165 on the end of the drive shaft 48 causes the three planetary gears 166 to travel around the inner circumference of the fixed ring gear 167 to cause rotation of the cage 171 at reduced speed, thereby to rotate the hollow square shaft 80 at reduced speed. As shown in Figure 4, the rotary cage 171 may be provided with a spindle 173 that extends into the forward end of the non-rotary shaft 115 to support the forward end of the non-rotary shaft and at the same time to permit the non-rotary shaft to be shifted longitudinally as heretofore described.

*Means to lead the cable to and from the reel*

The tow cable 45 extends from the reel 50 to the previously mentioned guide sheave 51 which is journalled in a bracket 177. The bracket 177 is unitary with a spindle 178 that is journalled in a suitable bearing sleeve 179 to permit the bracket to swing to various angles in accord with the number of layers of cable that is on the reel 50. From the guide sheave 51 the tow cable 45 extends rearward to loop around the previously mentioned sheave 63 carried by the two shock absorber arms 64. The tow cable then extends forward to loop around the previously mentioned idler sheave 62. From the idler sheave 62 the tow cable passes through a hollow longitudinal guard 180 and through the cable cutter 71 into engagement with a set of four radially positioned guide rollers 181 just inside a cable port 182 at the rear end of the unit housing.

The previously mentioned transverse wall 91 is formed with a pair of parallel rearwardly extending wings 185 that are interconnected at their bottom edges by a transverse web 186, the transverse web 186 being formed with an upturned flange 187 on which the previously mentioned micro-switch 65 is mounted. The forward end of the guard 180 is supported by a vertical web 188 (Figure 11) that interconnects the two wings 185 and the rear end of the guard is united to a casting 189.

The casting 189 has a pair of parallel forwardly extending wings 190 and is formed with brackets 191 in which the four radial guide rollers 181 are journalled. The casting 189 is attached by bolts 192 to a ring 193 that is in turn connected to the inner surface of the unit housing by suitable screws 194.

The idler sheave 62 is keyed to a countershaft 200 (Figure 4) that is journalled by suitable anti-friction bearings 201 in the two previously mentioned wings 185. Operatively connected to one end of the countershaft 200 is the previously mentioned tachometer generator 66, which generator is mounted on one of the walls 185 by suitable screws 202. The other end of the countershaft 200 extends through the previously mentioned drag switch 70 to the previously mentioned impulse generator 67, the switch and generator having a single housing connected to the other of the two wings 185 by suitable screws 203.

Figure 14:
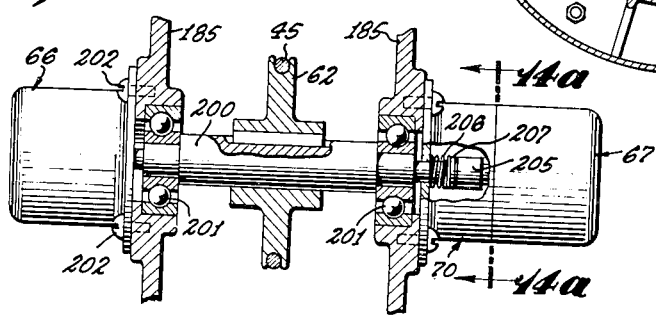
Figure 14 is a fragmentary section taken as indicated by the line 14—14 of Figure 10.
Figure 14A:
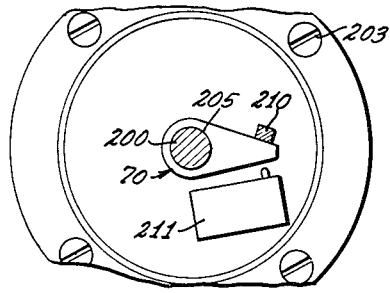
Figure 14a is a transverse section on an enlarged scale taken as indicated by the line 14a—14a of Figure 14.

As shown in Figures 14 and 14a, the drag switch 70 has a switch arm 205 that is rotatably mounted on the countershaft 200 and is in frictional engagement with the countershaft to tend to rotate therewith. The frictional engagement is provided by a coiled spring 206 that continually urges the switch arm 205 against a collar 207 that is fixedly mounted on the countershaft. When the countershaft 200 rotates counter-clockwise as viewed in Figure 14a for winding the tow cable 45 onto the reel 50, the switch arm 205 by tending to follow the rotation of the countershaft, comes to rest against a stop 210. On the other hand, the tendency of the switch arm 205 to follow the rotation of the countershaft 200 when the countershaft rotates clockwise as viewed in Figure 14a for unwinding the reel, causes the switch arm to go against and actuate a micro-switch 211 to close a circuit in the control system.

The two shock absorber arms 64 are torsion-resisting means and are releasably coupled by links 212 with a second similar pair of torsion-resisting arms 213. Both pairs of arms 64 and 213 are used for relatively heavy tow loads but for light tow loads, the links 212 are removed to permit the shock absorber arms 64 to function alone.

In a well known manner, the two shock absorber arms 64 are secured by cross bolts 214 to the opposite ends of a metal tube 215 that extends through a heavy elastic sleeve 216 made of rubber or rubber-like material. The elastic sleeve 216 is bonded both to the metal tube 215 and to a surrounding metal sleeve 217 (Figure 11). In like manner the second pair of shock absorber arms 213 are mounted by cross bolts 214 on the opposite ends of a metal tube 215 with an elastic sleeve 216 bonded both to the metal tube 215 and to an outer metal sleeve 217. The previously mentioned transverse web 186 that extends rearward from the transverse wall 91 is formed with two semi-cylindrical portions as shown in Figure 10, and a bottom plate 218 having similar semi-cylindrical portions is attached to the web by suitable screws 219, thus forming two cylindrical housings 220 in which the metal sleeves 217 are clamped in a non-rotatable manner. Both of the pairs of shock absorber arms 64 and 213 are biased by their elastic sleeves 216 to seek the positions shown in Figure 10 and swing counter-clockwise or leftward as viewed in Figure 10 in reaction to heavy loads and shocks transmitted by the tow cable 45.

The sheave 63 is rotatably mounted on an axle 224 that interconnects the outer ends of the two shock absorber arms 64. Preferably each of the two shock absorber arms 64 is connected to a corresponding dashpot, generally designated 225, to dissipate shock forces. Each dashpot 225 comprises an outer cylinder 226 connected to the corresponding shock absorber arm and an inner cylinder 227 connected to the casting 189. As shown in Figure 13, each of the inner cylinders 227 terminates in a sleeve 228 that embraces a spindle 229 extending laterally from one of the wings 190 of the casting. Preferably the sleeves 228 of the two inner cylinders are resiliently mounted on the spindles 229 and for this purpose rubber-like liners 230 embrace the spindles inside the sleeves. In like manner, the two outer cylinders 226 of the dashpots are formed with sleeves 231 that embrace the axle 224 with interposed rubber-like liners 232 as shown in Figure 11.

*Additional structure for using two target banners*

In the preferred practice of the invention for use with two sets of target banners and messengers, structure is added to the unit to store the sets of target banners and messengers, thus making the unit a self-containing device for mounting on an aircraft for target exercises. Figures 15 and 18 to 22, for example, show a unit in the form of a pod or streamlined housing with two compartments on its opposite sides, each compartment being adapted to contain both a target banner and a messenger. The unit comprises a main housing, generally designated by numeral 240, which may be substantially identical to the unit 30 heretofore described, and in addition the unit comprises two auxiliary housings, generally designated 241 and 242 (Figure 18), on opposite sides of the main housing. The two auxiliary housings are releasably attached to the main housing by suitable screws 243 and may be readily mounted and dismounted as desired. Each of the auxiliary housings 241 and 242 is divided into three compartments, namely a relatively large and long compartment 245 to store a target banner 246, a smaller and shorter compartment 247 to store a messenger 248, and a small solenoid compartment 250 in which are mounted a solenoid 251 for release of the target banner by remote control and a second solenoid 252 for release of the messenger by remote control.

Each of the two target banners 246 in the two auxiliary housings is connected by a leader 253 to a corresponding ring that loosely surrounds the tow cable 45 at the rear end of the main housing 240 and, in like manner, each of the two messengers 248 is connected by a leader 254 to a corresponding ring. Thus, Figure 19 shows a series of four rings positioned in proper sequence, including a rearmost ring 255 connected to one of the target banners, an adjacent ring 256 connected to the corresponding messenger, a third ring 257 connected to the second target banner, and a fourth ring 258 connected to the second messenger. Any suitable means may be provided to hold the four rings in position for release in response to the release of the corresponding target banners and messengers. For example, as shown in Figure 25, a series of four pairs of spring fingers 260 may be provided with each pair of fingers engaging one of the rings.

In the present embodiment of the invention, each of the auxiliary housings 241 and 242 is closed at its rear end by a dome-shaped sheet metal or plastic member 264 which is commonly termed a drogue and which may be released from the unit to serve as drag means for extending the corresponding target banner. The drogue 264 has a plurality of inner circumferentially spaced ears 265 (Figure 19) to which are connected short cables 266 attached to the rear end of the target banner.

Each of these drogues 264 telescopes over the rim of the corresponding auxiliary housing and is provided with a hook 267 that normally engages a corresponding hook 268 on the auxiliary housing. At a point diametrically opposite from the hook 268, the drogue is normally releasably engaged by a bell crank latch member 270. As best shown in Figure 22, the bell crank latch member 270 engages a shoulder 274 inside the drogue and is adapted for release operation in response to energization of the banner-releasing solenoid 251. For this purpose a threaded stem 275 of the solenoid 251 carries a pair of spaced nuts 276 which engage one arm of the bell crank latch member 270 from opposite sides.

As may be seen in Figure 19, two openings 277 and 278 are provided at the juncture of the drogue and the rim of the auxiliary housing with the target banner leader 253 extending through the opening 277 and with the messenger leader 254 extending through the opening 278.

A suitable coil spring 280 normally in compression between a plate 281 and an angular metal strap 282 inside the drogue 264 tends to separate the drogue from the auxiliary housing and becomes effective to do so as soon as the drogue is released by the bell crank latch member 270.

The plate 281, against which the coil spring 280 bears, is mounted on a hinge 285 to swing between an open position for releasing the messenger 248 and the normally closed position shown in Figures 19 to 22 for confining the messenger in the messenger compartment 247. The hinged plate 281 is releasably retained in closed position by a second bell crank latch member 286. As shown in Figure 21, this second bell crank latch member 286 is urged to its closed position by a light spring 287 and one arm of the bell crank latch member is positioned for operation by an operating plunger 288 of the messenger-releasing solenoid 252, the operating plunger extending axially in response to energization of the solenoid.

The manner in which the target banners and messengers are released in sequence in the course of flight may be readily understood. As shown in Figure 19, an automatic latch device 290 that is mounted on the end of the tow cable 45 has a forward laterally extending operating arm 291 and a more rearward latch member 292. The rearward latch member 292 normally extends laterally sufficiently to engage the various rings 255—258, but is adapted to retract momentarily in response to actuation of the operating arm 291 by a ring. When it is desired to launch the first target banner 246, the corresponding banner-launching solenoid 251 is energized to cause the drogue 264 to be pushed rearward into the air stream by the pressure of the coil spring 280. The drogue is then picked up by the air stream and, being connected to the trailing end of the target banner 246, pulls the target banner out of the compartment 245 with the target banner in correct longitudinal orientation. When the target banner is pulled clear of the auxiliary housing by the drogue, leader 253 pulls the corresponding ring 255 onto the automatic latch device 290 where the ring momentarily actuates the operating arm 291 and comes to a stop against the latch member 292 as shown in Figure 16. The tow cable may then be unreeled as desired.

For release of the target banner from the tow cable the second solenoid 252 is energized to release the hinged plate 281. The hinged plate then drops to its open position to permit the messenger in the compartment 247 to enter the air stream. Preferably a pusher plate 293 and a pair of cooperating pusher springs 294 are provided to eject the messenger in a positive manner. The messenger then pulls the corresponding ring 256 onto the automatic latch device 290 where the ring actuates the operating arm 291 to cause the latch member 292 to release the target banner. The latch mmeber 292 immediately returns to its normal effective position to stop the messenger ring 256.

Figure 2:
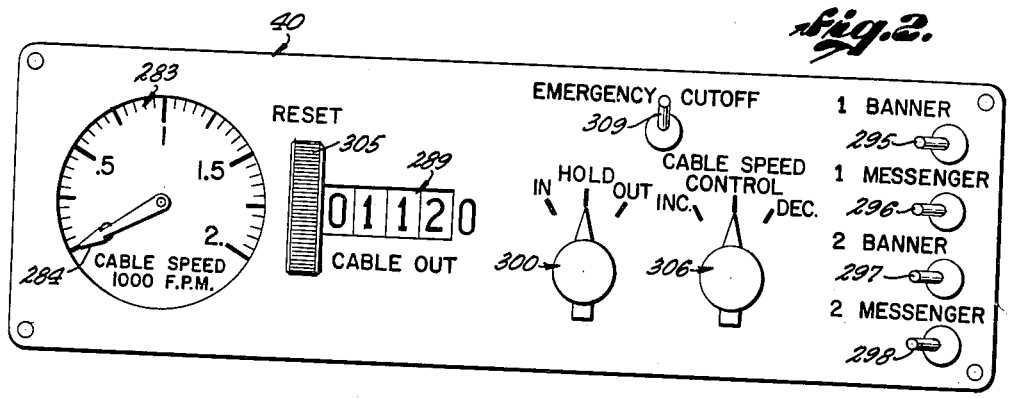
Figure 2 is a face view of the control panel.

The control panel 40 shown in Figure 2 for use with this form of the unit that includes the two auxiliary housings 241 and 242 has a tachometer 283 with a pointer 284 actuated by the previously mentioned tachometer generator 66. The panel also has a counter mechanism 289 that has visible numerals and is provided with a knurled reset wheel 305. A master directional control switch 300 on the panel 40 has an "in" position, an "out" position and a "hold" position. A cable speed control switch 306 has an "increase" position, a "decrease" and an "intermediate neutral" position. The panel 40 is further provided with a first banner switch 295, a first messenger switch 296, a second banner switch 297, and a second messenger switch 298. An emergency cut-off switch 309 is connected to an individual power source for detonation of the explosive to actuate the cable cutter 71.

Figure 2A:
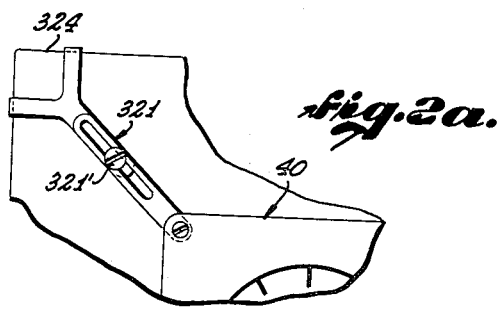
Figure 2a is a fragmentary face view showing means that may be used for releasably holding the control panel in the cockpit of the aircraft.

The panel 40 may be adapted for mounting in an aircraft in a temporary and removable manner by any suitable means. For example, each corner of the panel 40 may be provided with a Y-shaped claw member, generally designated 321, which is made in two separate slotted sections adjustably interconnected by a screw 321'. The Y-shaped claw 321 in Figure 2a is shown in engagement with the corner region of an instrument panel 324 in the cockpit of the aircraft. It is permissible to mask some of the instruments in a cockpit in this manner since certain instruments are not used in a flight for towing a target.

*Wiring diagram of the control system*

In the wiring diagram shown in Figure 23 the components are shown with the propeller feathered, the cable under no load, and the reel stopped, all of the contacts of the various relays being shown in their normal positions with the relay coils de-energized.

The control system may be energized either from the electrical system of the aircraft or by an independent power source. In this instance the control system includes a lead 299 from the positive side of the power source, the other side of the system being grounded as indicated.

The wiring diagram includes the following relay coils and associated contacts controlled thereby: "out" memory relay OM associated with the outward or unwinding direction of rotation of the reel, this relay having contacts OM–1, OM–2, and OM–3; "in" memory relay IM associated with the in or winding direction of rotation of the reel, this relay having contacts IM–1 and IM–2; feather control relay FC having a pair of contacts FC–1; an "out" brake relay having contacts OB–1 and OB–2; an "in" brake relay IB, having contacts IB–1 and IB–2; a feathering relay F having contacts F–1, F–2, F–3, F–4, and F–5; a directional relay DR having contacts DR–1, DR–2, DR–3, and DR–4, and ground power relay GP, having contacts GP–1 and GP–2.

The control system includes the previously mentioned master directional control switch represented by the dashed line 300, which switch has four interconnected switch arms designated, respectively, A, B, C, and D. Each of these four interconnected switch arms has an "out" position to cause unwinding rotation of the reel 50, a "hold" position for immobilization of the reel, and an "in" position for causing the reel to wind in the tow cable. Each of these four switch arms is connected directly to the lead 299 from the power supply.

At its "in" position, the switch arm A is in series with wire 301, normally closed contacts OM–3, wire 302, and relay coil IM. At both its "hold" and "out" positions the switch arm A is in series with the normally open contacts IM–2, wire 303, wire 304, and feather control relay coil FC.

Switch arm B at both its "hold" position and its "in" position is in series with normally open contacts OM–2, wire 303, and wire 304 to feather control relay coil FC. At its "out" position switch arm B is in series with wire 307, normally closed contacts IM–3, and wire 308 to relay coil CM.

Switch arm C is associated with the previously mentioned speed control switch 306 that is represented by a dotted line in the diagram and has two interconnected switch arms 310 and 311. The switch arm C is ineffective at its "hold" position, but at its "in" position is connected to the switch arm 310 by wire 312 and at its "out" position is connected to switch arm 311 by wire 313. The speed control switch 306 has a leftward position, as viewed in the wiring diagram, for increase in the speed of rotation of the reel and a rightward position for decrease of the speed. At its "in" position switch arm C is in series with relay coil IB through wire 314, contacts OM–4 and wire 315. At its "out" position switch arm C is in series with relay coil OB through wire 316, normally closed contacts IM–4, wire 317, and normally open cable tension switch 65.

The fourth switch arm D is ineffective at its "hold" position, but at both its "in" position and its "out" position is in series with wire 318, wire 319, normally closed contact FC–1, wire 320, and feathering relay coil F. Wire 317 associated with switch arm C is connected to wire 320 by wire 322, normally open contacts OB–1, wire 323, and normally open contacts F–3. Wire 323 is connected to one contact 325 of the previously mentioned centrifugal switch 55 by wire 326. Wire 315 is connected to wire 326 by wire 327 in series with normally open contacts IB–1. Wire 327 is connected by wire 328 with one side of a solenoid 330 which is the actuating element of the previously described rotary ratchet means 54.

As indicated by the dashed line 333 a feather switch 334 is operatively connected to the pitch control motor 47 to be open when the propeller blades are feathered and to be closed whenever the blades are adjusted out of their feathered positions. One side of the feather switch 334 is connected to the main lead 299 and the other side is connected by wires 335 and 336 with a second contact 337 of the centrifugal switch 55. Wire 335 is connected to relay coil IM by wire 340 together with normally open contact IM–1, and is connected to relay coil OM by wire 341, normally open contacts OM–1 and wire 308.

Also operatively connected to the pitch control motor 47, as indicated by the dashed line 343, are four switch arms, namely, two switch arms 345 and 346 to open to limit the travel of the pitch control mechanism at the two opposite extreme pitch adjustments of the propeller blades and switch arms 347 and 348 that function as feather limit switches.

At the "decrease" position of the speed control switch 306, both of its arms 310 and 311 are connected to relay coil FC by wires 349 and 350. Wire 350 is at times connected with the limit switch arm 345, the connection including normally closed contacts DR–1, wire 352, normally open contacts F–4 and wire 353. At the "increase" position of the speed control switch 306, its arm 311 is connected to the wire 352 by wire 355, and its other arm 310 is connected with a contact 356 associated with the limit switch arm 346, the connection including wire 360, normally open contacts F–5, and wire 361.

One side of the previously mentioned drag switch 70 is connected to the main lead 299 by wires 362 and 363, the other side of the drag switch being connected to relay coil DR. A wire 365 connects wire 363 with the arm of centrifugal switch 55. The normally closed contacts F–1 and F–2 are connected in parallel with a wire 366 which is, in turn, connected to wire 365 by wire 367. The other side of the normally closed contacts F–1 is connected by a wire 368 with a contact 369 associated with the feather limit switch 347 and the other side of the normally closed contacts F–2 is connected by a wire 370 with a contact 371 associated with the feather limit switch 348.

Associated with the four limit switch arms 345—348 is the previously mentioned rewind switch 57 represented by a dotted line in the wiring diagram. This rewind switch has two mechanically interlocked switch arms 375 and 376 and three associated contacts 377, 378, and 379. At the normal position of the rewind switch 57, its arm 375 cooperates with contact 377 to connect both of the two limit switch arms 345 and 347 in a wire 380 leading to one of the field coils 381 of the pitch control motor 47 for rotation of the motor in one direction. At the same time the other switch arm 376 of the rewind switch cooperates with contact 378 to connect the two limit switch arms 346 and 348 in a wire 382 leading to the other field coil 383 of the pitch control motor 47 for rotation of the switch control motor in the opposite direction. When the rewind switch 57 is in its alternate position, its switch arm 376 touches contact 379 to permit the pitch control motor 47 to be energized for rewinding the tow cable, the energizing circuit comprising: wire 362 from lead 299, wire 363, normally open contacts GP–2, wire 387, one arm 388 of an access door switch indicated by the dotted line 389, wire 390, wire 391, a normally open manually operable rewind control switch 392, wire 393, contact 379, rewind switch arm 376, wire 382, and field coil 383.

The previously mentioned impulse generator is represented by a switch 67 in the wiring diagram with one side of the switch grounded. The other side of the switch 67 is connected in parallel to the normally open contacts DR–4 and the normally closed contacts DR–5. Contacts DR–4 are connected to an "addition" coil 396 which in turn is connected to the wire 362 for energization thereby. In like manner the contacts DR–5 are connected to a "subtraction" coil 397 which, in turn, is connected to the wire 362 for energization thereby. The two coils 396 and 379 actuate the previously mentioned counter mechanism 289 on the control panel. The access door switch 389 has a second switch arm 400 which is connected to the brake release solenoid 163 and which is movable between two contacts 401 and 402. The contact 401 is connected by wires 404 and 405 with the contacts OB–2 and IB–2 respectively and these contacts are connected, in turn, to the previously mentioned wire 363. When the switch arm 400 cooperates with the contact 402, it connects the brake release solenoid 163 to the previously mentioned wire 391 through a wire 408 and a normally open brake release switch 410.

A ground power receptacle 412 for connection with a power source outside of the aircraft for energizing the motor 47 to rewind the tow cable when the aircraft is on the ground, is connected by a wire 413 with a ground power relay coil GP, the second side of the coil being grounded. The wire 413 is connected to the wire 387 by contacts GP–1 to complete a circuit for energizing the motor 47.

Wires 362, 363, 365, and 367 in series connect the first banner switch 295 with the power lead 299; a wire 415 connects the first banner switch 295 with the first messenger switch 296; a wire 416 connects the first messenger switch 296 with the second banner switch 297; and a wire 417 connects the second banner switch 297 with the second messenger switch 298. Wire 415 is connected to the first banner-releasing solenoid 251 through a switch 420; wire 416 is connected to the first messenger-releasing solenoid 252 through a switch 421; wire 417 is connected to the second banner-releasing solenoid 251 through a switch 422; and the second side of the second messenger switch 298 is connected to the second messenger-releasing solenoid 252 through a switch 423. The switches 420—423 are closed when the target banners and messengers have been properly stowed in the two auxiliary housings therebrought by placing the target banners and messengers under control of the four switches 295—298 on the panel 40. The four switches 420—423 may be closed automatically by the closing of access doors (not shown). It is apparent that this wiring arrangement insures that the target banners and messengers will be released in the required predetermined order.

Operation of the control system

If the pitch adjustment of the propeller blades 75 that causes the reel 50 to rotate in the direction to wind in the tow cable is considered as positive with respect to the feathered positions of the propeller blades, there will be four situations in which a change in propeller pitch in a positive direction will be required, namely, (1) to cause the stationary reel to rotate in the "in" direction; (2) to cause an increase in speed of rotation of the reel when the reel is already rotating in the "in" direction, (3) to cause a decrease in the speed of rotation of the reel when the reel is already rotating in the "out" direction; and (4) to cause the reel to "hold" i. e. stop when the reel is rotating in the "out" direction. Likewise there will be four situations in which a change in pitch in negative direction will be required, namely: (1) to cause the stationary reel to rotate in the "out" direction; (2) to cause an increase in the rate of rotation of the reel when the reel is already rotating in the "out" direction; (3) to cause a decrease in the rate of rotation of the reel when the reel is rotating in the "in" direction; and (4) to cause the reel to "hold" i. e. stop when the reel is rotating in the "in" direction.

It is apparent that in some instances a change in pitch in the positive direction is required to accelerate or decelerate the reel and in other instances a change in pitch in the negative direction is required to accelerate or decelerate the reel. The function of the switch arms A, B, and C of the directional control switch 300 is to route the control signals selectively to the field coils of the pitch control motor 47 as required by these different situations. Switch arm A creates deceleration control signals whenever the master directional control switch 300 is moved from its "in" position to either of its other two positions; switch arm B creates deceleration control signals whenever the directional control switch 300 is moved from its "out" position to either of its other two positions; switch arm C releases both deceleration control signals and acceleration control signals to the speed control switch 306 as well as to the two brake relay coils IB and OB.

The drag switch 70, by controlling the relay coil DR, cooperates with the switch arms A, B, and C in the selective routing of acceleration control signals and deceleration control signals to the proper field coils of the pitch control motor 47 and also causes the "addition" coil 396 and the "subtraction" coil 397 of the counter mechanism 289 to be energized selectively in accord with the direction of rotation of the reel. The switch arm D of the directional control switch 300 controls the feathering relay F for the purpose of causing the propeller blades to feather automatically whenever the directional master control switch 300 is moved to its intermediate "hold" position and the reel has been decelerated to the setting of centrifugal switch 55. Thus, when the feathering relay F is de-energized, contacts F-4 and F-5 open to remove control of the pitch control motor 47 from the switch arms A, B, and C, and contacts F-1 and F-2 close to cause automatic operation of the pitch control motor to restore the propeller blades to their feathered positions.

When the master directional control switch 300 is first moved to its "in" position, "in" memory relay IM is energized and will be latched by contacts IM-1 so long as the propeller blades are out of their feathered positions and also so long as the speed of rotation of the reel is above 25 R. P. M. Thus the circuit that energizes the relay coil IM is broken only when both the feather switch 334 is open at the feather position of the propellers and the centrifugal switch 55 is in its open position in response to reduction of the speed of the reel to less than 25 R. P. M.

The energization of "in" memory relay coil IM also causes contacts IM-2 to close to set up a circuit which will become fully active by reason of switch arm A whenever the master directional control switch 300 is moved from its "in" position to either of its other two positions. The normally closed contacts IM-3 prevent the other memory relay coil, i. e. relay coil OM, from being energized until an "in" cycle has been completed. In other words, if the master directional control switch 300 is operated to cause "in" rotation of the reel, the contacts IM-3 will prevent relay coil OM from being energized until the reel in the course of its "in" rotation is decelerated to a desirable degree and the propeller has been feathered.

In like manner, when the master directional control switch 300 is first moved to its "out" position, normally open contacts OM-1 close to latch the circuit through the relay coil OM and the circuit remains latched until the speed of rotation of the reel drops below 25 R. P. M. and the blades are restored to their feather positions to open the feather switch 334. As can be seen in the wiring diagram, both the relay coil IM and the relay coil OM can be energized from the main lead 299 through the feather switch 334 or can be energized alternately from the main lead 299 through wires 362, 363, 365, centrifugal switch 55, and wire 336.

The output sides of the contacts IM-2 and OM-2 are connected together and are connected to the wiring of the speed control switch 306 to cause the propeller blades to be shifted in pitch in the proper direction to slow down the reel to the point where the brakes 60 can be applied to completely decelerate and immobilize the reel. Feathering relay F must be energized throughout the time that cable motion is desired and beyond that time to the point where the reel has been decelerated sufficiently to permit the brake to be applied.

It is to be noted that switch arm D at either its "in" or its "out" position will energize the feathering relay coil F and that relay contacts F-3 will then complete a circuit through the centrifugal switch 55 for energizing the relay coil F independently of the master directional control switch so long as the speed of rotation of the reel is above 25 R. P. M. With control of energization of relay coil F transferred in this manner to the centrifugal switch, a cycle will be carried out automatically in which the feathering relay F will be de-energized when the speed of the reel drops below 25 R. P. M. and then the propeller blades will feather to complete the cycle. Only after this cycle is completed can a new cycle be started, regardless of whether or not in the meantime the master directional control switch 300 has been changed from one position to another. Thus the memory relays IM and OM serve as delay means for delaying the effectiveness of the master directional control switch 300, when such delay is desirable.

Switch arm C of the master directional control switch 300 not only completes circuits to the speed control switch 306, but also energizes the brake relay coils IB and OB selectively to control the brake 60. By virtue of the contacts IB-2 and OB-2 energization of either of the relay coils IB and OB will energize the brake release solenoid 163 for release of the brake 60. The provision of contacts IB-1 and OB-1 causes these two brake relay coils IB and OB to be latched until the centrifugal switch 55 breaks their circuits when the speed of rotation of the reel drops below 25 R. P. M.

The fact that the operation of the two brake relay coils IB and OB is interlocked with the operation of the memory relay coils IM and OM by means of contacts IM-4 and OM-4 prevents the brake relay coil OB from being energized during an "in" cycle of operation of the centrifugal switch and prevents the brake relay coil IB from being energized during an "out" cycle of operation of the centrifugal switch. Thus, throughout an "in" cycle, contacts IM-4 will remain open to keep brake relay coil OB from being energized, but at the end of the "in" cycle when it will be timely to start a new cycle, memory relay coil IM will be de-energized and contacts IM-4 will therefore close to allow brake relay coil OB to be energized by the master directional control switch 300. In like manner at the end of an "out" when it will be timely to begin a new cycle, memory relay coil OM will be de-energized and contacts OM-4 will close to allow brake relay coil IB to be energized by the master directional control switch 300.

The provision of the two brake relay coils IB and OB meets the different requirements for brake operation for reeling in and reeling out the tow cable. When the cable is being reeled out, the reel must not be allowed to rotate with the cable slack because in that event the cable would snarl and jam inside the reeling compartment of the unit. The necessary safeguard is provided by the cable tension switch 65 which opens to cause application of the brake 60 whenever the tension of the tow cable 45 is insufficient to lift the two shock absorber arms 64 from their biased positions shown in Figure 10. In this regard it is important to note that the effectiveness of the brake 60 is sufficient to immobilize the reel even when the propeller blades are adjusted in pitch for applying maximum torque to the reel.

With reference to the requirements for brake action when the master directional control switch 300 is placed in the "in" position, it is necessary to provide positive means for prevention of "out" rotation of the reel in the interval of time between the initial positioning of the master directional control switch at the "in" position and the response of the pitch control motor to adjust the propeller blades for reeling in the tow cable. In the absence of such a positive means, the tension on the tow cable would cause the reel to unwind the cable. The means to prevent such undesirable reverse rotation of the reel is the rotary ratchet means 54 which incorporates the solenoid 330. Such a solenoid-controlled ratchet means is a one-way or overrunning clutch and is readily available in commerce. For example, a device for this purpose is manufactured by The Formsprag Company of Van Dyke, Michigan. It is to be noted that energization of the brake relay coil IB causes the rotary ratchet solenoid 330 to be energized since the solenoid is in parallel with the relay coil.

In the course of a target run, a glance at the panel 40 reveals the number of feet of the tow cable that is unreeled and also reveals the instant speed of travel of the cable. The operator merely manipulates the master directional control switch 300 to cause the reel to rotate in either direction or to be immobilized. The cable speed control switch 306 may be operated independently of the switch 300 to increase or decrease the speed of rotation. The four switches 295–298 may be operated in sequence to cause target banners and messengers to be sent to the end of the tow cable in sequence, the last messenger releasing the second target banner from the end of the tow cable. If an emergency arises which would warrant releasing the cable from the aircraft, the operator merely reaches for the emergency cut-off switch 316 to detonate the explosive in the device 72 for actuating the cable cutter 71.

When the aircraft is on the ground, an access door (not shown) of the unit may be opened to permit an outside circuit to be plugged into the ground power receptacle 412 and to permit the gear shift lever 56 to be manipulated for operatively connecting the pitch control motor 47 with the reel. The opening of the access door automatically operates the access door switch 389 to permit energization of the brake release solenoid by the outside circuit and to place the brake release solenoid under control of the manually operable brake release switch 410. The shifting of the gear shift lever 56 automatically operates tthe rewind switch 57 to permit the outside circuit to energize the motor 47 for the rewinding operation of the reel.

*Modified form of reel driving mechanism*

The modified form of the invention shown in Figure 24 is largely identical with the structure heretofore described as indicated by the use of corresponding numerals to indicate corresponding parts. This modification of the invention comprises a pod or streamlined housing 450 of the same general configuration and character as heretofore described. In this practice of the invention, however, the forward end of the housing 450 is provided with an air turbine having radial blades 451 on a rotary hub housing 452.

The blades 451 extend across an annular air flow passage 455 the intake of which is at the nose of the pod as shown. The radial blades 451 of the air turbine may be varied in pitch by remotely controlled electrically actuated means inside the hub housing 452 in a well known manner. In this instance, it is contemplated that the air turbine will rotate in only one direction and that the range of pitch adjustment will merely vary the power taken from the air stream for rotation in the one direction. The circuit for remote pitch control may include three brushes 456 mounted on an inner cylindrical casing wall 457. The three brushes cooperate with three corresponding slip rings 458 on the drive shaft 48a, the slip rings being electrically connected with the pitch control means in the hub housing 452.

Suitable means may be provided to vary the air flow through the annular passage 455 thereby to serve as additional means to regulate the power that the air turbine derives from the air stream. For this purpose Figure 24 includes a regulating shutter in the form of a cylindrical member 460 that is movable axially to restrict flow through the annular passage 455 to various degrees. In the construction shown, the cylindrical member 460 is controlled by a plurality of non-rotary screw members 462 that are fixedly connected thereto. The screw members 462 extend through corresponding motors 463 and are operatively engaged by corresponding rotary nuts (not shown) which are inside the motors 463 and are rotated by the motors. It is apparent that the plurality of motors 463 may be energized in unison by remote control to vary the degree to which the cylindrical shutter 460 cuts off air flow through the annular passage 455.

It is to be understood that the turbine blades 451 may be of fixed pitch, if desired, and that the cylindrical shutter 460 may be omitted if desired.

The drive shaft 48a that is actuated by the air turbine terminates in the previously mentioned sun gear 165 that is in mesh with the three previously mentioned planetary gears 166. As heretofore described, the planetary gears 166 are carried by a cage 171 which drives the hollow rectangular reel shaft 80, the cage being connected to the body 92 at the end of the reel shaft by a pair of longitudinal connecting members 172 (Figure 6) that extend past the gears 106 and 107.

In this modification of the invention each of the planetary gears 166 is unitary with a second smaller planetary gear 470. The smaller planetary gears 470 mesh with a second sun gear 472 that is unitary with an inner rotary housing 473. The rotary housing 473 is rotatably mounted by suitable bearings 474 on the drive shaft 48a. The larger planetary gears 166 are in mesh with an outer ring gear 475 that is integral with a second outer rotary housing 476.

It is apparent that if the second sun gear 472 is held stationary with the outer ring gear 475 free to spin, actuation of the drive shaft 48a will cause the smaller planetary gears 470 to travel around the stationary sun gear 472 to rotate the cage 171 in one direction thereby to rotate the reel 50 in the same rotary direction. During this operation the outer ring gear 475 will spin freely. On the other hand, if the outer ring gear 475 is held stationary and the second sun gear 472 is allowed to spin freely, actuation of the planetary gears 166 will cause the planetary gears to traverse the inner circumference of the outer ring gear to cause the cage 171 and the reel 50 to rotate in the opposite direction. Any suitable means may be provided to immobilize the sun gear 472 and the outer ring gear 475 selectively to cause rotation of the reel in the opposite directions in this manner.

In the construction shown in Figure 24, the inner rotary housing 473 carries a ring-shaped electromagnet 480 which cooperates with a fixed armature ring 481 to brake and immobilize the sun gear 472; and the outer rotary housing 476 carries a second ring-shaped electromagnet 482 that cooperates with the armature ring from the other side to brake and immobilize the outer ring gear 475. The armature ring 481 may be provided with liner plates 483 on its opposite sides for frictional contact by the two electromagnets.

Each of the two electromagnets is provided with a plurality of small sleeves 485 by means of which it is slidingly supported by corresponding pins 486 for axial movement towards and away from the armature ring 481. Suitable spring means (not shown) normally holds each of the two electromagnets 480 in spaced relation to the intervening armature ring 481, the springs being sufficiently light to be overcome by the electromagnetic force generated by the electromagnets.

The manner in which this modified form of the invention operates may be readily understood from the foregoing description. When the reeling unit is being transported through the air the air turbine will actuate the drive shaft 48a in one direction at a rate which depends upon the velocity of the air stream, the pitch adjustment of the air turbine blades 451 and the adjustment of the cylindrical shutter 460. To cause the reel 50 to rotate in one direction the electromagnet 480 is energized to immobilize the inner sun gear 472, the other electromagnet 482 being de-energized to permit the outer ring gear 475 to spin freely. To rotate the reel in the opposite direction the second electromagnet 482 is energized to immobilize the outer ring gear 472, the other electromagnet 480 being de-energized to permit the inner sun gear 472 to spin freely. To immobilize the reel 50 both of the electromagnets are energized to immobilize both the inner sun gear 472 and the outer ring gear 475. It is apparent that with one of the electromagnets energized to cause rotation of the reel in one direction the other electromagnet may be either intermittently energized at full strength or energized at reduced strength to cause a braking or retarding action to slow down the reel.

Our description in specific detail of selected practices of the invention, by way of an example and to illustrate the principles involved, will suggest various changes, substitutions and other departures from our disclosure that properly lie within the spirit and scope of the appended claims.

We claim:

1. In an apparatus of the character described for controlling a cable from an aircraft, the combination of: a streamlined pod to be attached to the aircraft with the longitudinal axis thereof substantially parallel to the fore and aft axis of the aircraft; a reel to wind and unwind said cable, said reel being mounted inside said pod with the axis of the reel extending longitudinally of the pod; means carried by the pod to actuate said reel under remote control, means carried by said pod at a fixed position laterally of the reel to guide the cable; and means to reciprocate the reel longitudinally along its axis to level the winding of the cable on the reel.

2. A combination as set forth in claim 1 which includes a mechanism rotating as a whole with the reel that reciprocates the reel in response to the rotation of the reel.

3. A combination as set forth in claim 2 in which said mechanism for reciprocating the reel is positioned at least in major portion inside the reel.

4. In an apparatus of the character described for controlling a cable from an aircraft, the combination of: a reel carried by the aircraft to wind and unwind said cable; remotely controlled means to actuate said reel; and shock absorber means forming a variable offset in said cable to respond to changes in tension of the cable and to at least partially absorb shock forces in the towing of devices and to permit devices to be launched for engagement by the tow cable in the course of flight.

5. In an apparatus of the character described for controlling a cable from an aircraft, the combination of: a streamlined pod to be carried by the aircraft; a reel inside said pod positioned with the axis of the reel longitudinally of the pod; means carried by the pod for deriving power from the air stream for actuation of said reel; guide means for the cable positioned in said pod to one side of the reel; means to reciprocate the reel longitudinally on its axis to level the winding of the cable on the reel; remote control means for controlling the rotation of the reel by said power deriving means; and shock absorber means responsive to the tension of the cable to absorb shock loads transmitted to the cable.

6. In an apparatus of the character described for controlling a cable from an aircraft, the combination of: a reel to wind and unwind said cable; means to derive power from the airstream in the course of flight of the aircraft; control means having an "in" position for applying said power to actuate said reel in the direction to wind in said cable and an "out" position for applying said power to actuate said reel in the direction to unwind said cable; a first delay means operable to prevent said control means at its "in" position from applying said power to the reel; a second delay means operable to prevent said control means at its "out" position from applying said power to the reel; means responsive to movement of said control means to its "out" position to operate said first delay means until the reel decelerates to the predetermined degree; and means responsive to movement of said control means to its "in" position to operate said second delay means until the reel decelerates to a predetermined degree.

7. In an apparatus of the character described for controlling a cable from an aircraft, the combination of: a reel to wind and unwind said cable; guide means for the cable spaced from said reel laterally thereof; means propelled by the airstream to rotate said reel in the course of flight to wind and unwind said cable; a first means to cause relative reciprocative movement between said reel and said guide means longitudinally of the reel at a given ratio between the rate of reciprocative movement and the rate of rotation of the reel for distribution of a cable of a given diameter along the reel; a second means for causing relative reciprocative movement between said reel and said guide means longitudinally of the reel at a higher ratio for distribution of a cable of larger diameter along the reel; and mean to put said first and second means into operation selectively.

8. In an apparatus of the character described, the combination of: a reel for use on an airborne vehicle; an adjustable-pitch airscrew for actuating said reel by power derived from the airstream; power-actuated means movable in opposite directions to vary the pitch of said airscrew, thereby to actuate said reel in opposite directions and to change the speed of the reel when the reel is rotating in either direction; a first circuit to actuate said power-actuated means in one direction; a second circuit to actuate said power-actuated means in the other direction; means to deliver signals to accelerate and decelerate the reel; and means responsive to the direction of rotation of said reel to route said signals to said two circuits selectively.

9. In an apparatus of the character described, the combination of: a reel for use on an airborne vehicle; an adjustable-pitch airscrew for actuating said reel from power derived from the airstream; power-actuated means movable in opposite directions to vary the pitch of said airscrew in opposite directions thereby to actuate said reel in opposite directions and to change the speed of the reel when the reel is rotating in either direction; control means movable to a first position for rotation of said reel in said one direction and movable to a second position for rotation of said reel in said other direction; a first circuit means for actuating said power-actuated means in response to movement of said control means to its first position; a second circuit means for actuating said power-actuated means in response to movement of said control means to its second position; means responsive to movement of said control means to said first posititon to prevent operation of said second circuit means while said reel is rotating in said one direction at a substantial rate; and means responsive to movement of said control means to said second position to prevent operation of said first circuit means while said reel is rotating in said other direction at a substantial rate.

10. In an apparatus of the character described, the combination of: a reel for use in an airborne vehicle to reel a cable in and out; an adjustable-pitch airscrew to derive power from the airstream for actuating said reel; two pitch control circuits for adjusting the pitch of the airscrew in opposite directions respectively; control means having an "in" position, a "hold" position, and an "out" position; means to create deceleration signals in response to movement of said pitch control means out of its "in" position; means to create deceleration signals in response to movement of said control means out of its "out" position; and means responsive to the direction of said reel to route said signals to said two circuits selectively.

11. A combination as set forth in claim 10 which includes a speed control to create deceleration and acceleration signals; and in which said direction-responsive means routes deceleration signals from said speed control to said two circuits selectively.

12. In an apparatus of the character described, the combination of: a reel for use on an airborne vehicle to reel a flexible member in and out; an adjustable-pitch airscrew to derive power from the airstream for actuating said reel; two pitch control circuits for adjusting the pitch of said airscrew in opposite directions respectively; control means having an "in" position and an "out" position for energizing said two circuits selectively for rotating said reel in opposite directions; means responsive to the speed of rotation of said reel; a first delay means for energization to prevent said control means from energizing a pitch-control circuit at its "out" position; a second delay means for energization to prevent said control means from energizing a pitch-control circuit at its "in" position; a first delay circuit including said speed-responsive means to energize said first delay means in response to movement of said control means to its "in" position and to deenergize the first delay means when the speed of the reel drops to a predetermined magnitude; and a second delay circuit including said speed-responsive means to energize said second delay means in response to movement of said control means to its "out" position and to de-energize the second delay means when the speed of the reel drops to a predetermined magnitude.

13. A combination as set forth in claim 12 in which each of said delay circuits includes a switch responsive to the pitch adjustment of said adjustable pitch screw to prevent de-energization of the corresponding delay means when said airscrew is out of feather adjustment.

14. In an apparatus of the character described, the combination of: a reel for use on an airborne vehicle to reel a cable in and out; and adjustable-pitch airscrew to derive power from the airstream for actuating said reel; two pitch control means for adjusting the pitch of said airscrew in opposite directions, respectively; means to create signals to control said two pitch control means; reeling-direction control means in series with said signal-creating means to route said signals to said two pitch-control means selectively to rotate said reel in opposite directions selectively; speed-control means in series with said reeling-direction control means to route said signals to said two pitch control means selectively for accelerating and decelerating said reel; reeling-direction sensing means responsive to changes in direction of said reel; and means in series with said speed control means to route said signals to said two pitch control means selectively in accord with the instant direction of rotation of the reel.

15. In an apparatus of the character described for controlling a cable from an aircraft, the combination of: a reel to wind and unwind said cable; means including rotatable blades propelled by the airstream adjacent the aircraft to provide power for actuating said reel in the course of flight of the aircraft; and a remotely controlled variable transmission for delivering power from said blades to said reel.

16. In an apparatus of the character described for controlling a cable from an aircraft, the combination of: a reel to wind and unwind said cable; means including rotatable blades propelled by the airstream adjacent the aircraft to provide power to actuate said reel in the course of flight of the aircraft; and a remotely controlled variable transmission for delivering power from said blades to said reel, said transmission comprising planetary gearing for rotating said reel in opposite directions selectively in response to rotation of said blades in one direction.

17. In an apparatus of the character described for controlling a cable from an aircraft, the combination of: a reel to wind and unwind said cable; means including rotatable blades propelled by the airstream adjacent the aircraft to provide power for actuating said reel in the course of flight of the aircraft; brake means to immobilize said reel; and means responsive to the tension of said cable to actuate said brake means when the cable slackens while said reel is unwinding the cable.

18. In an apparatus of the character described for controlling a cable from an aircraft, the combination of: a reel to wind and unwind said cable; means including rotatable blades propelled by the air stream adjacent the aircraft to actuate said reel in the course of flight of the aircraft; and means responsive to the speed of rotation of said reel to immobilize the reel when the speed of rotation drops to a predetermined magnitude.

19. In an apparatus of the character described for controlling a cable from an aircraft, the combination of: a reel carried by the aircraft to wind and unwind said cable; remotely controlled means to actuate said reel; and shock absorber means including at least two sheaves looping the cable back on itself, at least one of said sheaves being mounted for yielding movement to shorten the cable loop in responsive to shock loads on the cable.

20. In an apparatus of the character described for controlling a cable from an aircraft, the combination of: a streamlined pod to be carried by the aircraft; a reel inside said pod to wind and unwind said cable; means carried by the pod for actuation of said reel under remote control; an auxiliary streamlined housing releasably attachable to said pod to contain devices to be released to said cable in the course of flight; and remotely controlled means in said auxiliary housing for release of devices to the cable in the course of flight.

21. In an apparatus of the character described for controlling a cable from an aircraft, the combination of: a streamlined pod releasably attached to the aircraft to be carried thereby; a reel inside said pod positioned with the axis of the reel longitudinally of the pod; means carried by the pod for deriving power from the air stream for actuation of said reel; guide means for the cable positioned in said pod to one side of the reel; means to reciprocate the reel longitudinally along its axis to level the winding of the cable on the reel; remote control means for controlling the rotation of the reel by said power deriving means; and shock absorber means responsive to the tension of the cable to absorb shock loads transmitted to the cable.

22. In an apparatus of the character described for controlling a cable from an aircraft, the combination of: a streamlined pod releasably attached to the aircraft to be carried thereby; a reel inside said pod positioned with the axis of the reel longitudinally of the pod; means carried by the pod for deriving power from the air stream for actuation of said reel; guide means for the cable positioned in said pod to one side of the reel; means to reciprocate the reel longitudinally along its axis to level the winding of the cable on the reel; remote control means for controlling the rotation of the reel by said power deriving means; shock absorber means responsive to the tension of the cable to absorb shock loads transmitted to the cable; and at least one auxiliary housing releasably attachable to said pod to carry devices to be towed by the cable and to be launched in flight.

23. In an apparatus of the character described for controlling a cable from an aircraft, the combination of: a reel to wind and unwind said cable; means to derive power from the airstream in the course of flight of the aircraft; control means having an "in" position for applying said power to actuate said reel in the direction to wind in said cable and an "out" position for applying said power to actuate said reel in the direction to unwind said cable; and means to apply said power for deceleration of said reel whenever said control means is moved out of either of said positions.

24. In an apparatus of the character described for controlling a cable from an aircraft, the combination of: a reel to wind and unwind said cable; means to derive power from the airstream in the course of flight of the aircraft; control means having an "in" position for applying said power to actuate said reel in the direction to wind in said cable and an "out" position for applying said power to actuate said reel in the direction to unwind said cable; and means responsive to the tension of said cable to decelerate said reel when the cable slackens while said control means is in said "out" position.

25. In an apparatus of the character described for controlling a cable from an aircraft, the combination of: a streamlined housing for releasable mounting on the aircraft and having an opening for said cable; a reel inside said housing for winding and unwinding said cable; an airscrew mounted on said housing to derive power from the airstream for actuating said reel; electrically actuated control means in said housing to vary the operation of said reel by said air stream; and a control means connected to said body by circuit means for remote control of said control means, said control means being adapted for temporary mounting in an aircraft.

26. In an apparatus of the character described for controlling a cable from an aircraft, the combination of: a reel with said cable wound thereon for rotation to unwind the cable; rotatable blades for propulsion by the air stream adjacent the aircraft to actuate said reel in the course of flight; wall means surrounding said blades and forming a ram inlet for directing a portion of the air stream to the blades for actuation thereof; and valve means to vary the portion of the air stream passing through said inlet to the blades thereby to vary the speed of rotation of said reel.

27. In an apparatus of the character described for controlling a cable from an aircraft, the combination of: a reel with said cable wound thereon for rotation to unwind the cable; wall means forming a passage headed into the air stream to cause air to be rammed therethrough, said passage being of annular flared configuration at its discharge end; a propeller with blades of fixed pitch mounted in said passage and operatively connected to said reel to control rotation thereof; and control means to vary the effective cross-sectional area of said passage thereby to vary the rate of air flow through said passage for controlling the speed of rotation of said reel.

References Cited in the file of this patent

UNITED STATES PATENTS

| | | |
|---|---|---|
| 705,331 | Emery | July 22, 1902 |
| 1,551,251 | Hopkins | Aug. 25, 1925 |
| 1,971,340 | Foulk | Aug. 28, 1934 |
| 2,183,540 | Campbell | Dec. 19, 1939 |
| 2,464,073 | Cotton | Mar. 8, 1949 |
| 2,523,738 | Trimbach | Sept. 26, 1950 |
| 2,538,719 | Wing Shee | Jan. 16, 1951 |

FOREIGN PATENTS

| | | |
|---|---|---|
| 667,202 | Great Britain | Feb. 27, 1952 |